United States Patent
Kandanala et al.

(10) Patent No.: US 9,319,618 B2
(45) Date of Patent: Apr. 19, 2016

(54) INTERACTIVE MASTHEAD

(75) Inventors: Venket S. Kandanala, Highland Village, TX (US); Nicky Pinakin Joshi, Flower Mound, TX (US); Anand N. Sankaran, MGR Nagar (IN); Rajesh Narayanan, Virugambakkam (IN); Lisa A. Caputo, Dade City, FL (US); Karthik Srinivasan, Flower Mound, TX (US); Mousumi Dasgupta, Irving, TX (US); Jubish C. Parambath, Madipakkam (IN); Sudharsan Selvakumar, Irving, TX (US); Sumithra Jayaraman, Chrompet (IN)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 185 days.

(21) Appl. No.: 13/205,843

(22) Filed: Aug. 9, 2011

(65) Prior Publication Data

US 2013/0042269 A1    Feb. 14, 2013

(51) Int. Cl.
*H04N 5/445* (2011.01)
*H04N 21/4227* (2011.01)
*H04N 21/431* (2011.01)
*H04N 21/482* (2011.01)
*H04N 21/81* (2011.01)

(52) U.S. Cl.
CPC ....... *H04N 5/44543* (2013.01); *H04N 21/4227* (2013.01); *H04N 21/4316* (2013.01); *H04N 21/482* (2013.01); *H04N 21/812* (2013.01); *H04N 2005/44556* (2013.01); *H04N 2005/44565* (2013.01)

(58) Field of Classification Search
CPC .......... H04N 21/26283; H04N 21/472; H04N 21/482
See application file for complete search history.

(56) References Cited

U.S. PATENT DOCUMENTS

| | | | |
|---|---|---|---|
| 2004/0261110 A1* | 12/2004 | Kolbeck et al. ................. | 725/78 |
| 2009/0171780 A1* | 7/2009 | Aldrey et al. .................... | 705/14 |
| 2010/0153997 A1* | 6/2010 | Baumgartner et al. ......... | 725/39 |
| 2011/0131607 A1* | 6/2011 | Thomas et al. .................. | 725/40 |
| 2013/0198784 A1* | 8/2013 | Chane et al. .................... | 725/61 |

* cited by examiner

*Primary Examiner* — Gigi L Dubasky

(57) ABSTRACT

A method and system that provides a television service; receives a customer input to access a graphical user interface that includes a main menu pertaining to the television service; retrieves the graphical user interface; and displays the graphical user interface via the customer device, wherein the graphical user interface includes a main menu body and an interactive masthead having an interactive element that permits a customer to access content via the interactive element.

20 Claims, 7 Drawing Sheets

INTERACTIVE MASTHEAD

BACKGROUND

Television services, offered by service providers, typically include a main menu screen that offers various sub-services, such as, video-on-demand, pay-per-view, games, settings, and help. The customers are able to navigate through the main menu screen using a remote control device to access and use these sub-services.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

According to an exemplary embodiment, a main menu screen includes an interactive masthead versus a non-interactive graphic or banner head. For example, typically, a main menu screen includes a banner that identifies the service provider and may include other non-interactive graphic elements. According to an exemplary embodiment, this space of the main menu screen includes an interactive masthead to promote contents and services and permit customers to navigate via the interactive masthead. According to another exemplary embodiment, the interactive masthead may be used with screens, other than the main menu screen.

According to an exemplary embodiment, the interactive masthead includes an interactive graphical user interface that permits customers to navigate to content (e.g., a trailer of a video-on-demand movie, etc.), information about the content (e.g., articles about the cast and/or story, etc.), and/or permit customers to order and purchase (e.g., buy or rent) the content. According to an exemplary embodiment, the interactive masthead may also permit customers to perform other types of functions or navigational commands, such as, for example, auto-tune to a channel, or launch a widget.

According to an exemplary embodiment, the interactive masthead may advertise promotions available to the customers. For example, the interactive masthead may promote a movie, a television channel/package, a sports event, or other types of content, subscriptions, etc., and permit the customers to navigate to the content or obtain more information via the interactive masthead. According to another example, the interactive masthead may include other forms of messages or information, such as, for example, a social message, a reminder to view a purchased pay-per-view event, or other customer-specific item.

According to exemplary embodiment, the interactive masthead provides promotions to customers that are context-sensitive to the current screen. By way of example, when a customer is viewing a pay-per-view screen, the interactive masthead may promote a pay-per-view boxing event. According to another example, when a customer is viewing a digital video recorder (DVR) screen, the interactive masthead may promote eSATA drive integration. Customers may then access content or obtain further information pertaining to the promotion via the interactive masthead, as previously described.

Figure 1:
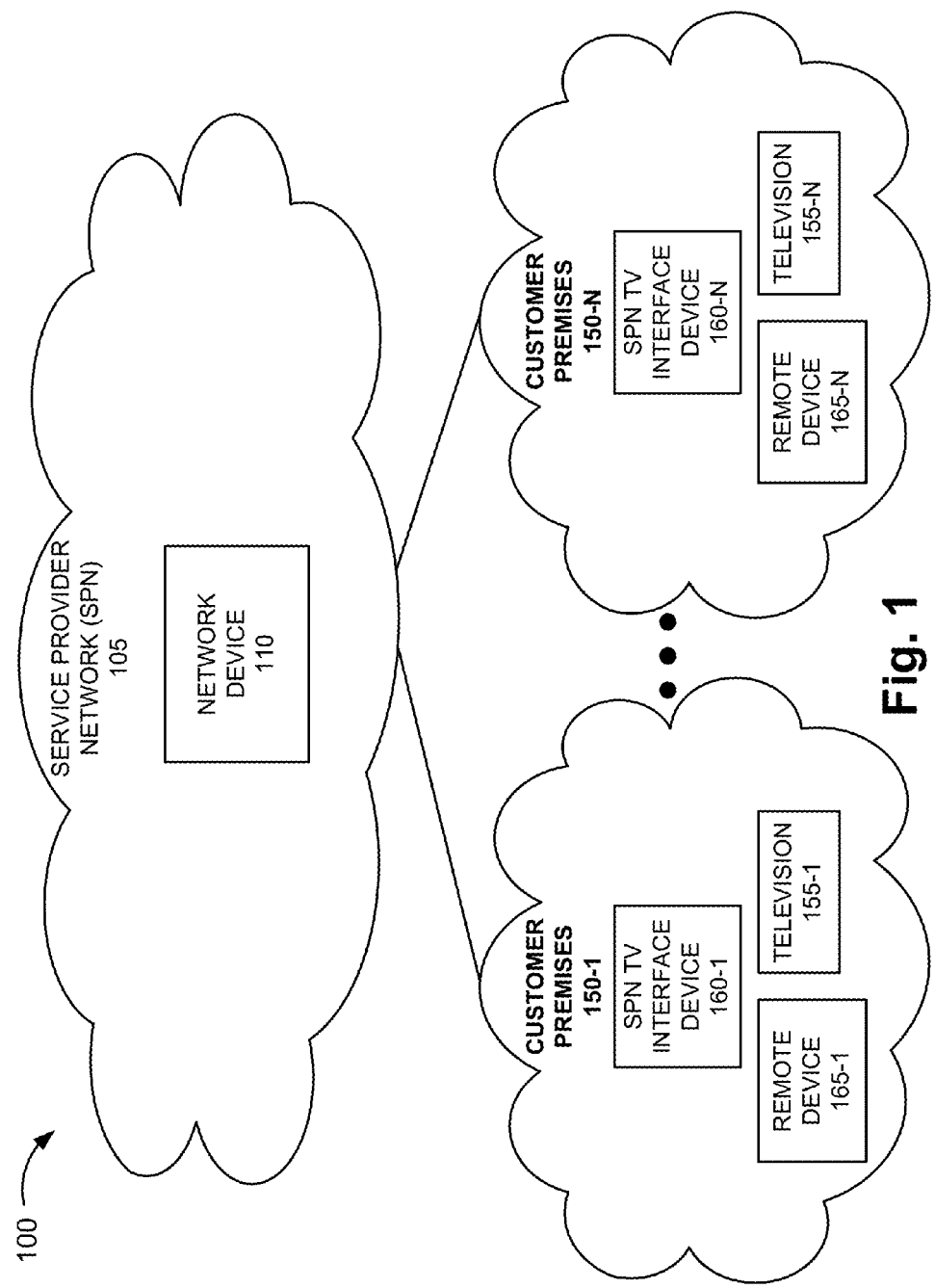
FIG. 1 is a diagram illustrating an exemplary environment in which an exemplary embodiment of an interactive masthead may be implemented.

FIG. 1 is a diagram illustrating an exemplary environment 100 in which an exemplary embodiment of the interactive masthead may be implemented. As illustrated in FIG. 1, environment 100 may include a service provider network (SPN) 105 and customer premises 150-1 through 150-N (referred to generally as customer premises 150). Service provider network 105 includes, among other devices, a network device 110. Customer premises 150 includes, among other devices, televisions (TVs) 155-1 through 155-N (referred to generally as TV 155 or TVs 155), SPN TV interface devices 160-1 through 160-N (referred to generally as SPN TV interface device 160 or SPN TV interface devices 160), and remote devices 165-1 through 165-N (referred to generally as remote device 165 or remote devices 165).

The number of devices and networks, and the configuration in environment 100 are exemplary and provided for simplicity. In practice, according to other embodiments, environment 100 may include additional devices, fewer devices, different devices, and/or differently arranged devices, than those illustrated in FIG. 1.

According to other embodiments, a single device may be implemented as multiple devices and/or multiple devices may be implemented as a single device. For example, although television 155 and SPN TV interface device 160 are illustrated as separate devices, television 155 and SPN TV interface device 160 may be combined into a single device. A device may be implemented in a centralized or distributed fashion. Additionally, a device may be implemented according to various architectures (e.g., a client device, a server device, a peer device, or a combination thereof).

Additionally, or alternatively, in practice, environment 100 may include additional networks and/or differently arranged networks, than that illustrated in FIG. 1. For example, customer premises 150 may include a local area network (LAN) and/or other types of networks may be included in environment 100, such as a network provider network, a content provider network, the Internet, etc.

Also, according to other embodiments, one or more functions and/or processes described as being performed by a particular device may be performed by a different device, or some combination of devices. By way of example, one or more functions and/or processes described as being performed by network device 110 may be performed by SPN TV interface device 160, or vice versa, or in combination. Additionally, or alternatively, one or more functions and/or processes described as being performed by network device 110 may be performed by SPN TV interface device 160 or vice versa, or in combination. Environment 100 may include wired and/or wireless connections among the devices illustrated. By way of example, customer premises 150 may connect to service provider network 105 via optical fiber, cable, etc.

Service provider network 105 includes a network that distributes or makes available television service. Service provider network 105 may correspond to a satellite-based network and/or a terrestrial-based network. Although not illustrated, service provider network 105 may include, for example, program distribution devices, program storage devices, application servers, billing devices, security devices, etc. Service provider network 105 may also provide other types of services to customers, such as Internet service and/or mobile service. According to an exemplary embodiment, customers may have access to the interactive masthead, as described herein, via such services (e.g., Internet service, mobile service) when using suitable customer devices (e.g., a desktop computer, a laptop computer, a mobile device (e.g., a smartphone, a tablet device, etc.), a vehicle-based device (e.g., a vehicle communication system), etc.).

Network device 110 includes one or multiple network devices that provide the interactive masthead to customers, as described herein. Network device 110 may take the form of a computational device (e.g., a Web server, a server, an application server, a computer). According to an exemplary embodiment, network device 110 may store the interactive programming guide, other menus (e.g., a main menu and other sub-menus (e.g., video-on-demand, pay-per-view, games, widgets, settings, help, digital video recorder (DVR), television listings, messages, etc.)), and the interactive masthead that are accessible to customers via their television service. The interactive masthead is described further below.

Customer premises 150 include locations where customers receive service from service provider network 105. For example, customers may receive services at home, at work, or at locations when the customers are mobile. Customer premises 150 include devices that allow customers to receive television service including the interactive masthead. For example, in a home setting, customer premises 150 may include TVs 155, SPN TV interface devices 160, and remote devices 165. Additionally, according to another embodiment, customer premises 150 may include various devices to allow customers to use the interactive masthead via Internet service and/or mobile service, as described herein.

TV 155 may include a device to display PPV programs. According to an exemplary embodiment, TV 155 may correspond to a television. According to other embodiments, TV 155 may correspond to other types of display devices, such as, for example, a monitor, a mobile device having a display, etc. According to an exemplary embodiment, TV 155 and SPN TV interface device 160 may be separate devices, as illustrated in FIG. 1. According to other embodiments, TV 155 may include SPN TV interface device 160 or include some of the functionalities associated with SPN TV interface device 160.

SPN TV interface device 160 may include a device that communicates with service provider network 105 to provide television service including the interactive masthead. According to an exemplary embodiment, SPN TV interface device 160 may take the form of a client device, a thin client device, a set-top box, a converter box, a receiver device, a server device, a peer device, a tuner device, and/or a digibox. According to an exemplary embodiment, SPN TV interface device 160 may also include a digital video recorder (DVR) and/or a hard drive. SPN TV interface device 160 may also provide multi-room television services.

Remote device 165 may include a device that communicates with TV 155 and/or SPN TV interface device 160 to allow a customer to interact with SPN TV interface device 160 and/or TV 155. Remote device 165 may include one or multiple input mechanisms (e.g., buttons, a display, a touchpad, a touchscreen, a microphone, etc.) to receive a customer's input and, among other things, allow the customer to interact with SPN TV interface device 160. According to an exemplary embodiment, remote device 165 may correspond to a remote control device (e.g., a set-top box controller, a TV controller, a converter box controller, etc.).

According to other embodiments, remote device 165 may correspond to other types of devices. For example, remote device 165 may take the form of a tablet device, a mobile communication device, a personal digital assistant (PDA), a handheld device, a smartphone, or some other type of user device. According to still other embodiments, remote device 165 may include TV 155. According to yet other embodiments, remote device 165 may include TV 155 and SPN TV interface device 160 or include some of the functionalities associated with SPN TV interface device 160.

Figure 2:
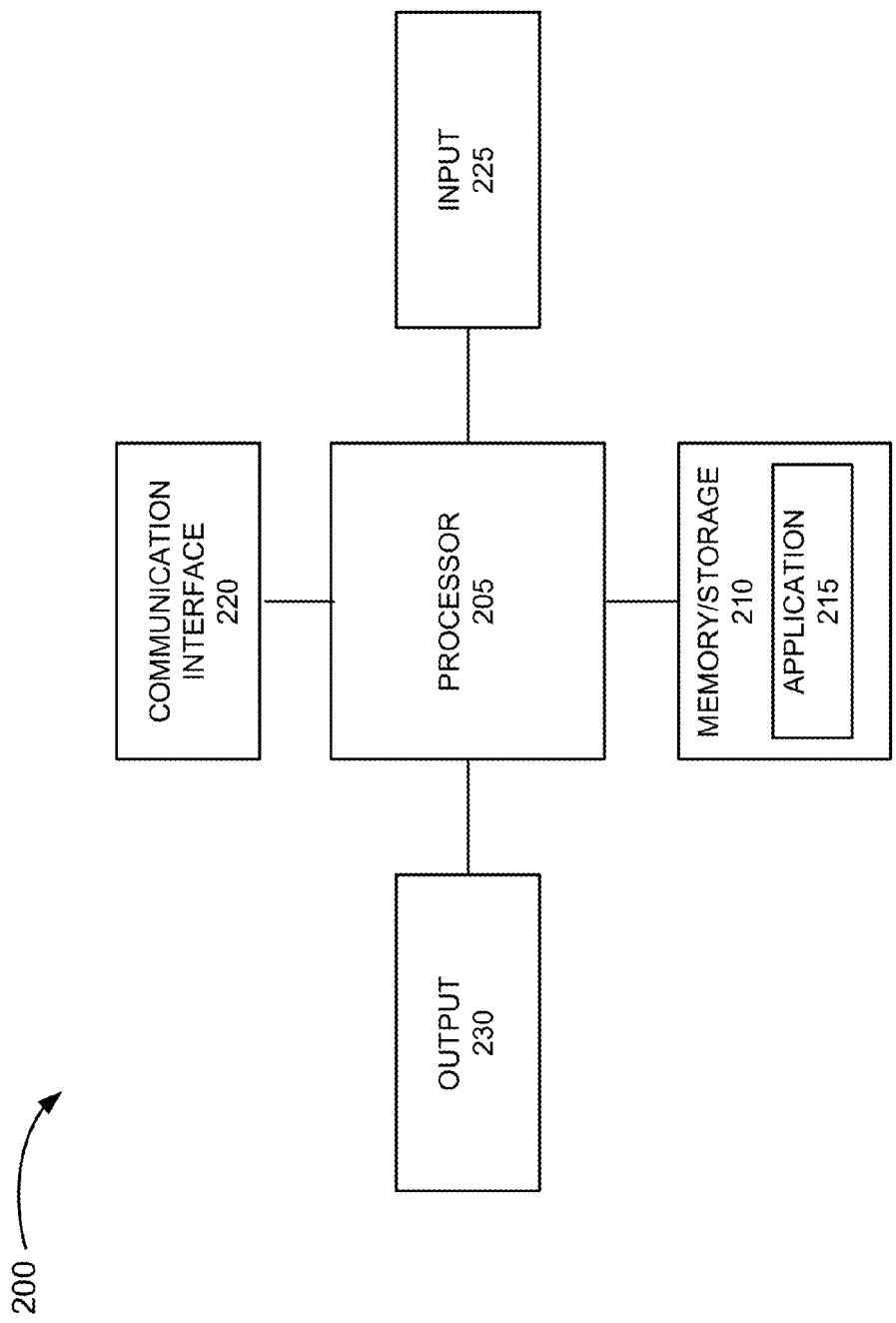
FIG. 2 is a diagram illustrating exemplary components of a device that may correspond to one or more of the devices in the environment depicted in FIG. 1.

FIG. 2 is a diagram illustrating exemplary components of a device 200 that may correspond to one or more of the devices in environment 100. For example, device 200 may correspond to network device 110 and/or one or more devices in customer premises 150. As illustrated, according to an exemplary embodiment, device 200 may include a processor 205, memory/storage 210 including an application 215, a communication interface 220, an input 225, and an output 230. According to other embodiments, device 200 may include fewer components, additional components, different components, and/or a different arrangement of components than those illustrated in FIG. 2 and described herein.

Processor 205 may include one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Depending on the type of processor 205, processor 205 may be implemented as hardware (e.g., a microprocessor, etc.), a combination of hardware and software (e.g., a SoC, etc.), may include one or multiple memories (e.g., memory/storage 210), etc.

Processor 205 may control the overall operation or a portion of operation(s) performed by device 200. Processor 205 may perform one or multiple operations based on an operating system and/or various applications (e.g., application 215). Processor 205 may access instructions from memory/storage 210, from other components of device 200, and/or from a source external to device 200 (e.g., a network, another device, etc.).

Memory/storage 210 may include one or multiple memories and/or one or multiple other types of tangible storage mediums. For example, memory/storage 210 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 210 may include a hard disk (e.g., a magnetic disk, an optical disk, a magneto-optic disk, a solid state disk, etc.) a floppy disk (e.g., a zip disk, etc.), a tape, a Micro-Electromechanical System (MEMS)-based storage medium, and/or a nanotechnology-based storage medium. Memory/storage 210 may include drives for reading from and writing to the tangible storage medium.

Memory/storage 210 may be external to and/or removable from device 200, such as, for example, a Universal Serial Bus (USB) memory stick, a dongle, a hard disk, mass storage, off-line storage, or some other type of storing medium (e.g., a computer-readable medium, a compact disk (CD), a digital versatile disk (DVD), a Blu-Ray® disk (BD), etc.). Memory/storage 210 may store data, application(s), and/or instructions related to the operation of device 200.

Application 215 may include software or a program that provides various services and/or functions. For example, with reference to network device 110 and according to an exemplary embodiment, application 215 may include one or multiple applications or programs for providing the interactive masthead, as described herein.

Communication interface 220 may permit device 200 to communicate with other devices, networks, systems, etc. Communication interface 220 may include one or multiple wireless interfaces and/or wired interfaces. Communication interface 220 may include one or multiple transmitters, receivers, and/or transceivers. Communication interface 220 may operate according to one or multiple protocols, standards, and/or the like.

Input 225 may permit an input into device 200. For example, input 225 may include a keyboard, a mouse, a camera, a scanner, a microphone, a display, a touchpad, a touchscreen, a touchless screen, a button, a switch, an input port, voice recognition logic, speech recognition logic, fingerprint recognition logic, a web cam, and/or some other type of visual, auditory, tactile, etc., input component. Output 230 may permit an output from device 200. For example, output 230 may include a speaker, a display, a touchscreen, a touchless screen, a light, an output port, and/or some other type of visual, auditory, tactile, etc., output component.

Device 200 may perform processes and/or functions, as described herein, in response to processor 205 executing instructions (e.g., application 215) stored by memory/storage 210. By way of example, the instructions may be read into memory/storage 210 from another memory/storage 210 or from another device via communication interface 220. The instructions stored by memory/storage 210 may cause processor 205 to perform one or more processes described herein. Alternatively, for example, according to other implementations, device 200 may perform one or more processes described herein based on the execution of hardware (processor 205, etc.), the execution of hardware and firmware, or the execution of hardware, software, and firmware.

As previously described, the interactive masthead permits customers to navigate and access various contents, perform various functions, etc. Examples of the interactive masthead are described below.

Figure 3:
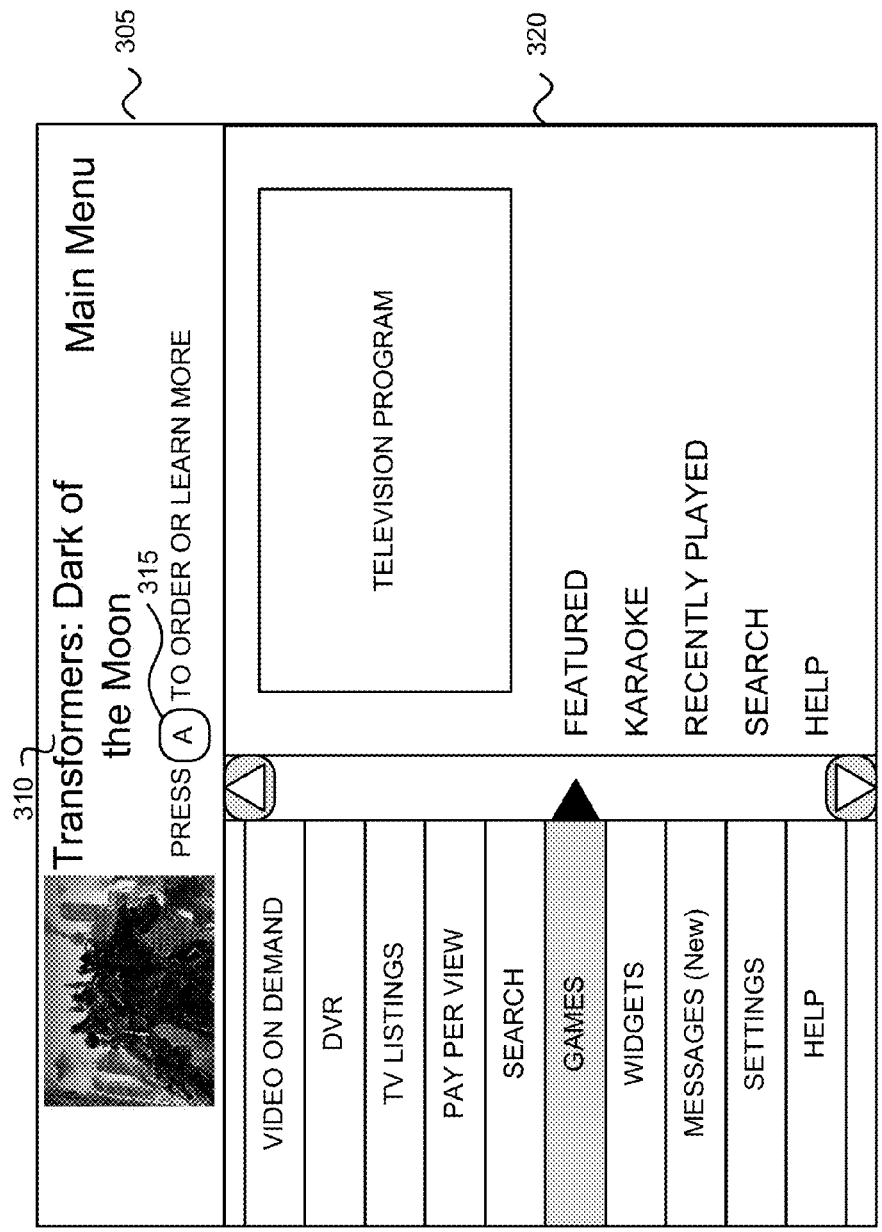
FIG. 3 is a diagram illustrating an exemplary graphical user interface including an exemplary interactive masthead.

FIG. 3 is a diagram illustrating an exemplary graphical user interface including an exemplary interactive masthead 305. As illustrated, according to this example, interactive masthead 305 is associated with a Main Menu screen that includes an interactive body 320.

Additionally, according to this example, interactive masthead 305 includes an advertisement 310 pertaining to a movie (e.g., Transformers: Dark of the Moon), such as a pay-per-view movie or a video-on-demand movie and an interactive element 315 that permits a customer to order the movie or find out additional information about the movie. With reference to the additional information, the customer may view trailers of the movie, view descriptions regarding the cast members and/or the story associated with the movie, bookmark the movie to a customer's favorites.

As previously described, according to other examples, advertisement 310 may pertain to a subscription package (e.g., a sports package (e.g., NFL RedZone Package, etc.) or a premium channel package (e.g., HBO®, etc.)) or bundling, or some other type of pay-per-view event, video-on-demand event, etc. Additionally, for example, interactive element 315 may permit a customer to auto tune to a particular channel that offers a free preview of the subscription package or bundling. For example, the channel may offer a free viewing of HBO® or the NFL RedZone Package. While in this example, interactive element 315 provides that the customer press a particular button via, for example, remote device 165, interactive element 315 may take other forms, such as a menu, an icon, or other some other type of interactive, graphical element.

According to other embodiments, the interactive masthead may be implemented relative to graphical user interfaces other than the Main Menu. For example, the interactive masthead may be implemented relative to a video-on-demand graphical user interface, a DVR graphical user interface, a television listing graphical user interface, a pay-per-view graphical user interface, a games graphical user interface, a widget graphical user interface, a messages graphical user interface, a settings graphical user interface, a help graphical user interface, a marketplace graphical user interface, etc. An example of the interactive masthead associated with a PPV menu is described below. In this example, the interactive masthead is context sensitive.

Figure 4:
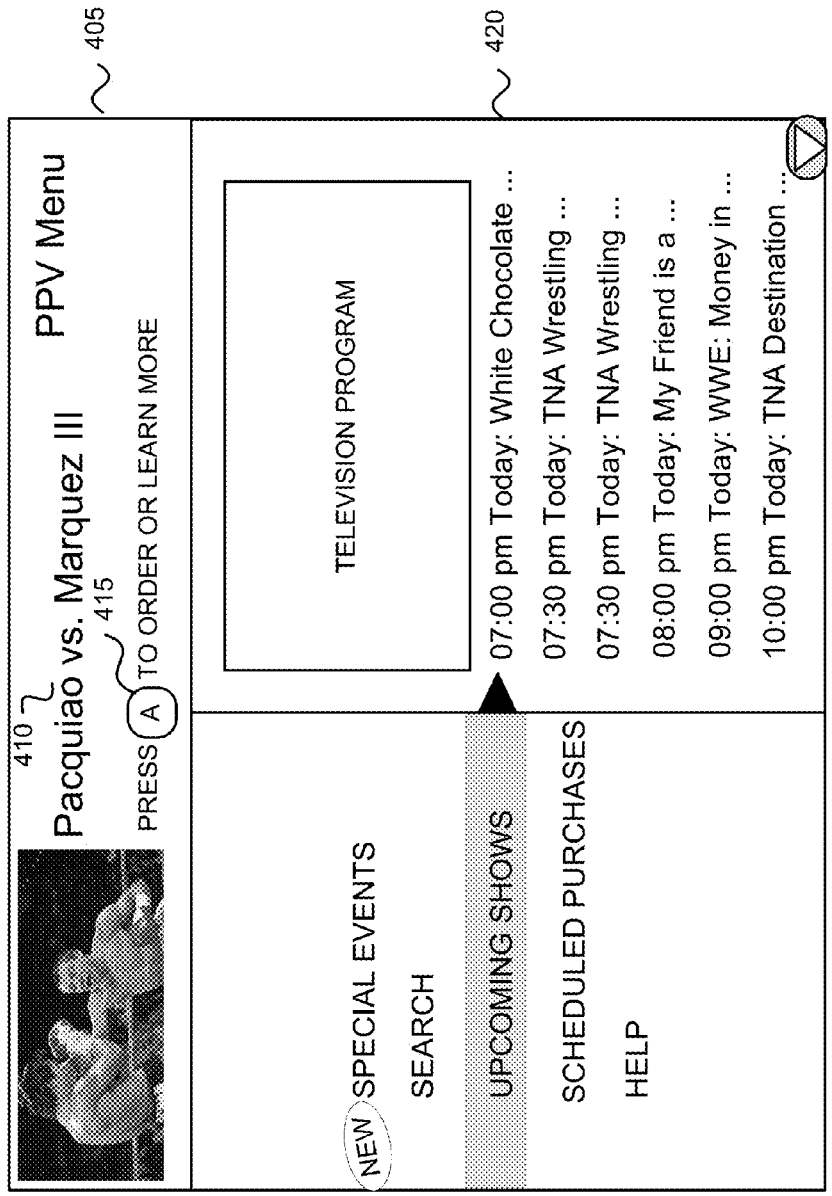
FIG. 4 is a diagram illustrating another exemplary graphical user interface including an exemplary interactive masthead.

FIG. 4 is a diagram illustrating an exemplary graphical user interface including an exemplary interactive masthead 405. As illustrated, according to this example, interactive masthead 405 is associated with a PPV Menu screen that includes an interactive body 420. As previously described, according to an exemplary embodiment, the interactive masthead is context sensitive. For example, interactive masthead 405 includes content that promotes or grants access to content pertaining to PPV.

According to this example, interactive masthead 405 includes an advertisement 410 pertaining to a pay-per-view event (e.g., Pacquiao vs. Marquez III) and an interactive element 415 that permits a customer to order the pay-per-view event or obtain additional information about the pay-per-view event. With reference to the additional information, the customer may view promotional programs (e.g., interviews, training sessions, etc.) associated with the participants, view previous fights between Pacquiao and Marquez, or other descriptive information (e.g., boxing records, etc.).

According to an exemplary implementation, interactive masthead 405 may include a reminder to a customer regarding a purchased pay-per-view event. For example, advertisement 410 may take the form of a reminder to the customer that indicates, among other things, the title of the pay-per-view event, the date and time of the pay-per-view event, and the television channel to watch the pay-per-view event.

Figure 5:
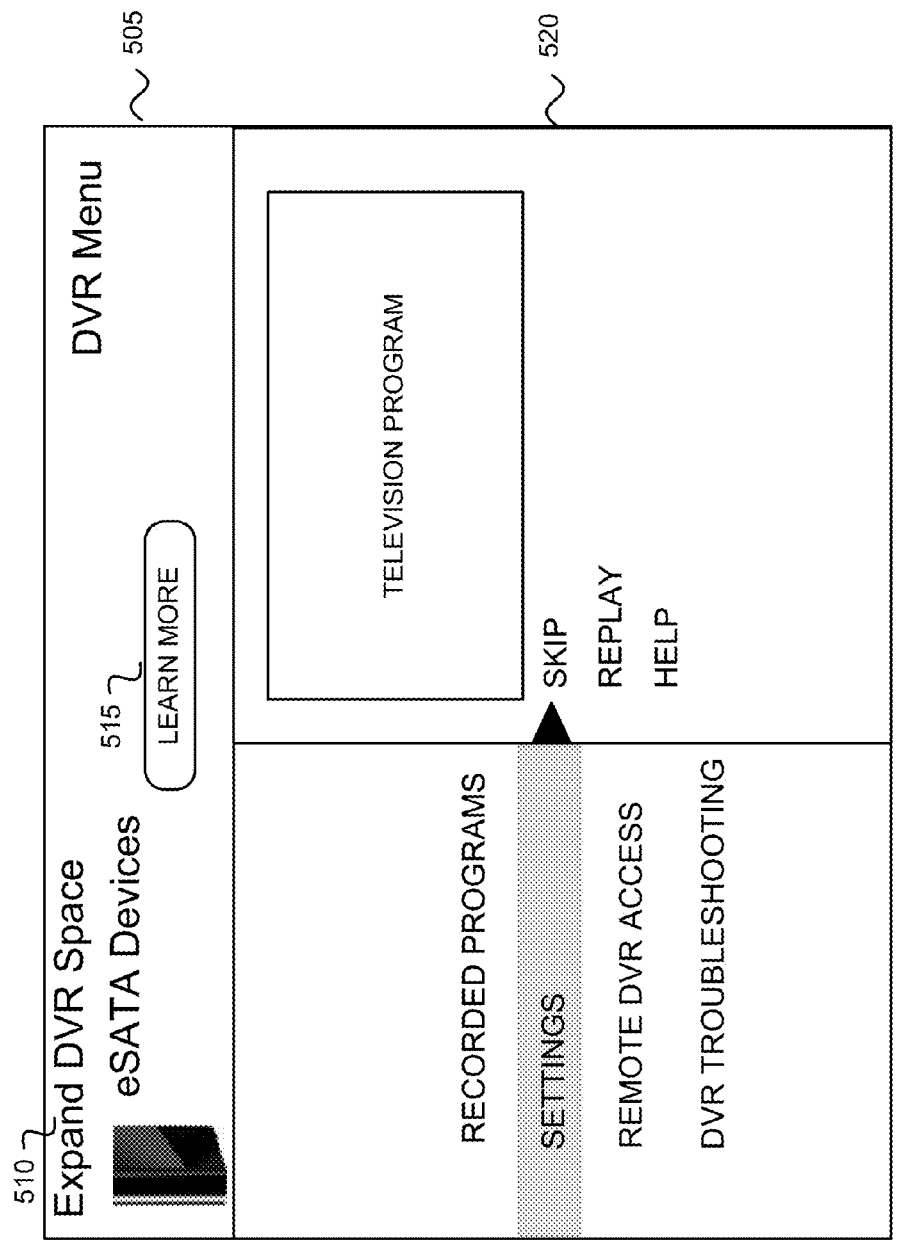
FIG. 5 is a diagram illustrating another exemplary graphical user interface including an exemplary interactive masthead.

According to another example, the interactive masthead may pertain to a service or a feature of a service. For example, FIG. 5 is a diagram illustrating an exemplary graphical user interface including an exemplary interactive masthead 505. As illustrated, according to this example, interactive masthead 505 is associated with a DVR Menu screen that includes an interactive body 520. Interactive masthead 505 is also another example of a context-sensitive, interactive masthead.

According to this example, interactive masthead 505 includes an advertisement 510 pertaining to a DVR service feature (e.g., expanding DVR space by using an external storage device, such as, an external Serial Advanced Technology Attachment (eSATA) device) and an interactive element 515 that permits a customer to obtain more information (e.g., explanation of expanding storage space, recommended eSATA devices, setup instructions, etc.). In this example, interactive element 515 is a selectable or a clickable graphical element of the graphical user interface (e.g., in contrast to selecting a button on remote device 165).

Figure 6:
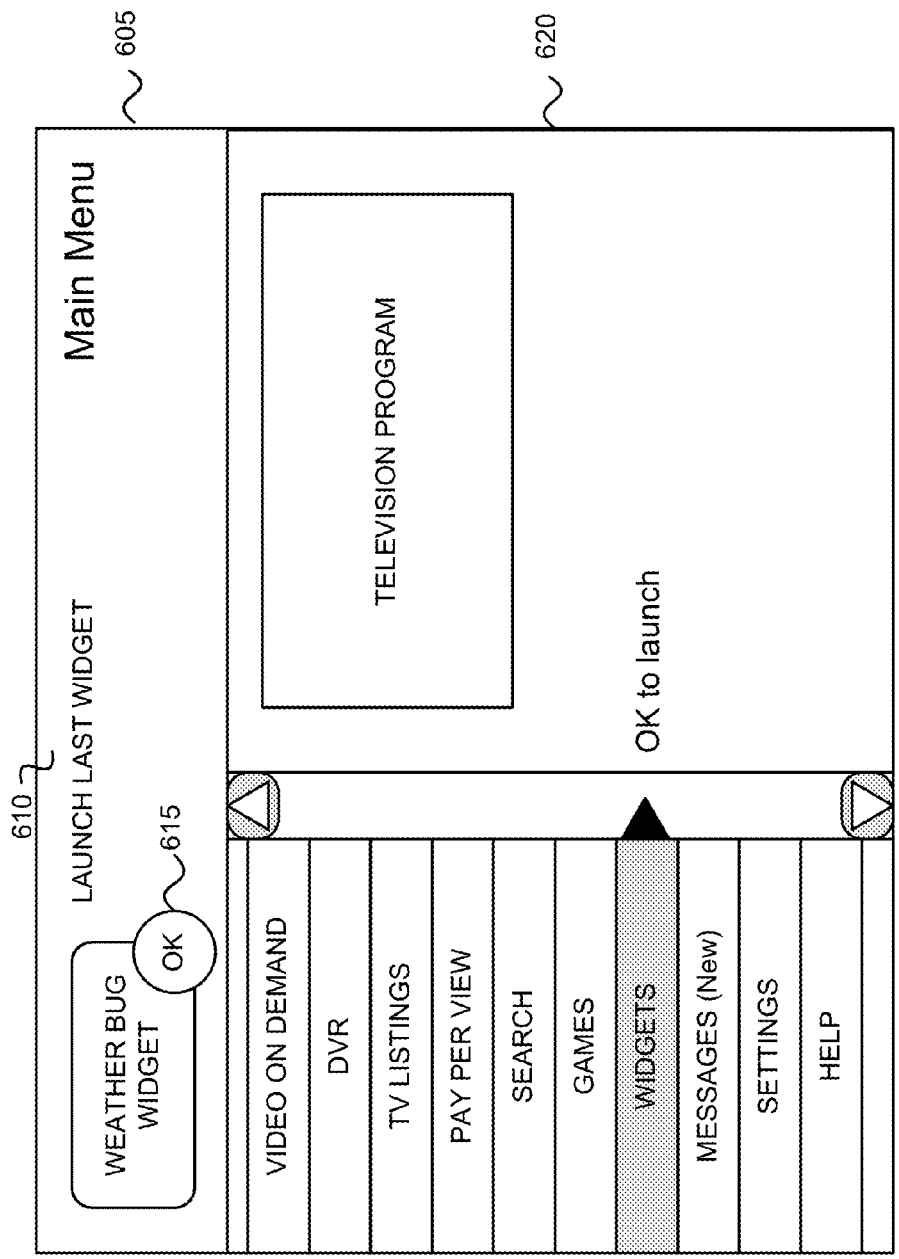
FIG. 6 is a diagram illustrating yet another exemplary graphical user interface including an exemplary interactive masthead.

FIG. 6 is a diagram illustrating an exemplary graphical user interface including an exemplary interactive masthead 605 and an interactive body 620. Interactive masthead 605 includes a description 610 and an interactive element 615. According to this example, interactive masthead 605 permits a customer to launch a widget from the Main Menu. As illustrated, the customer may launch a Weather Bug widget by navigating to the graphical element representative of the Weather Bug widget and pressing an "OK" button via the customer's remote device 165. Additionally, in this example, the widget is the last widget the customer has previously used. For example, network device 110 or some other device in service provider network 105 may store information pertaining to the last widget launched. When the customer accesses the Main Menu screen, the stored information is used to generate interactive masthead 605. According to other examples, the widget may be a new widget introduced by the service provider.

Figure 7:
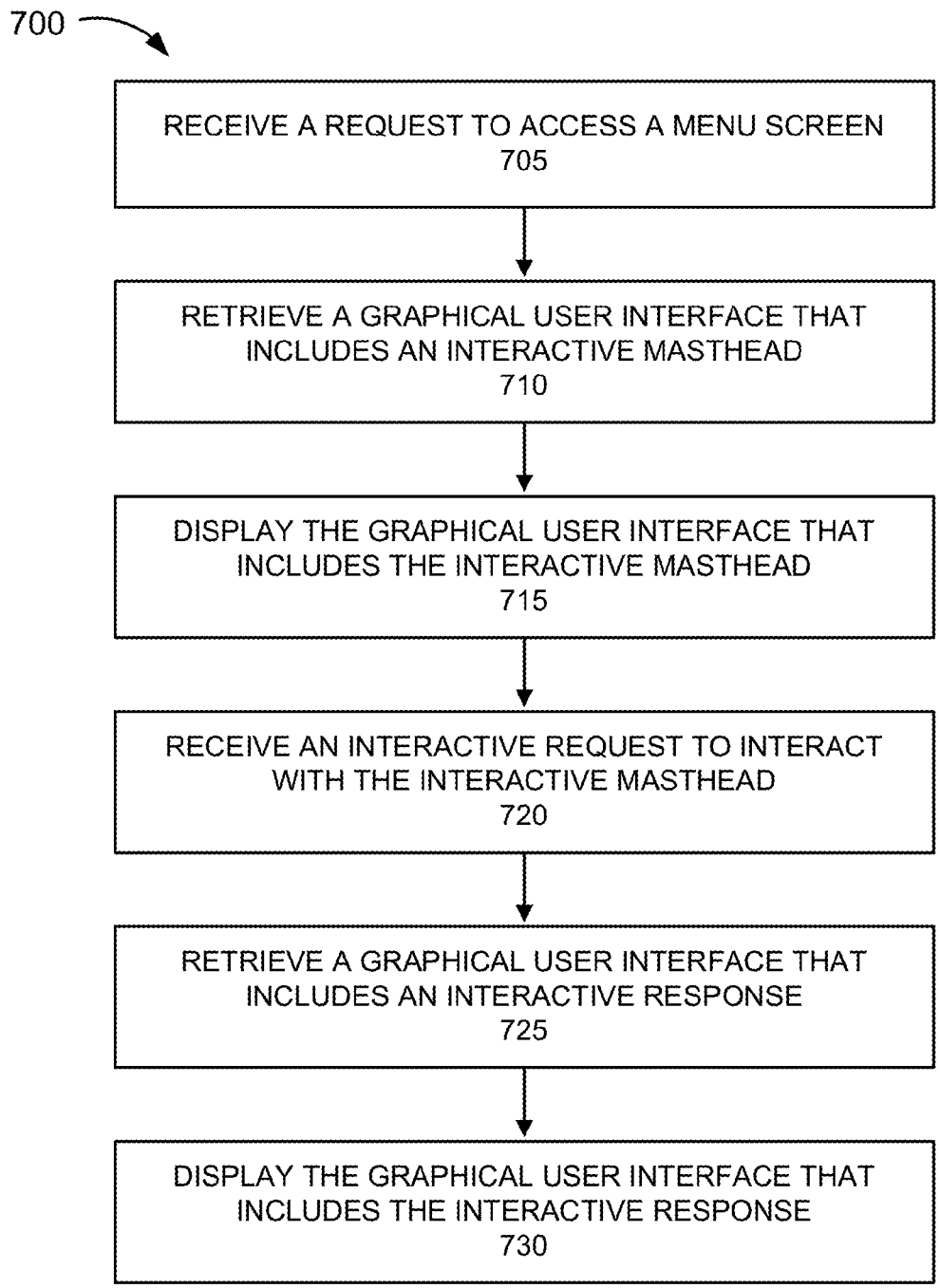
FIG. 7 is a flow diagram illustrating an exemplary process associated with the interactive masthead.

FIG. 7 is a flow diagram illustrating an exemplary process 700 associated with the interactive masthead. According to an exemplary embodiment, network device 110 may perform one or more steps described in process 700. For example, processor 205 may execute an application 215 to perform the steps described. Process 700 is described relative to the interactive masthead and the Main Menu. As previously described, according to other embodiments, the interactive masthead may be implemented relative to other menus, sub-menus, and/or graphical user interface screens. Additionally, the interactive masthead may be context-sensitive. Process 700 is described in relation to the devices illustrated and described with reference to FIG. 1.

Referring to FIG. 7, in block 705, a request to access a menu screen is received. For example, a customer invokes the request via remote device 165 and SPN TV interface device 160. As an example, remote device 165 may include an input (e.g., a Menu button) to launch a Main Menu graphical user interface. Network device 110 receives the request to access the Main Menu screen via SPN TV interface device 160.

In block 710, a graphical user interface that includes an interactive masthead is retrieved. For example, network device 110 retrieves the graphical user interface that includes the interactive masthead based on the request. Network device 110 provides the graphical user interface that includes the masthead to SPN TV interface device 160.

In block 715, the graphical user interface that includes the interactive masthead is displayed. For example, SPN TV interface device 160 displays the graphical user interface that includes the interactive masthead via television 155. The interactive masthead includes an interactive element, such as interactive element 315, 615, etc. The interactive masthead may also include an advertisement, such as, advertisement 310, or other type of descriptive element pertaining to the interactive masthead or the interactive element, such as description 610.

In block 720, an interactive request to interact with the interactive masthead is received. For example, the customer invokes the interactive request via remote device 165 and SPN TV interface device 160. Network device 110 receives the interactive request via SPN TV interface device 160.

In block 725, a graphical user interface that includes an interactive response is retrieved. For example, network device 110 retrieves the graphical user interface that includes the interactive response based on the interactive request. Network device 110 provides the graphical user interface that includes the interactive response to SPN TV interface device 160. As previously described, depending on the particular interactive masthead, the customer may access various contents (e.g., pay-per-view content, video-on-demand, etc.), information pertaining to the contents (e.g., cast members, participants, etc.), launch a widget, auto-tune to a particular channel, etc.

In block 730, the graphical user interface that includes the interactive response is displayed. For example, SPN TV interface device 160 displays the graphical user interface that includes the interactive response via television 155.

According to other embodiments, one or more blocks illustrated in FIG. 7 and described as being performed by a device may be performed by another device. For example, SPN TV interface device 160 may load and store an interactive menu system, based on a communication with network device 110, when the customer turns on the SPN TV interface device 160 and uses a television service.

The foregoing description of embodiments provides illustration, but is not intended to be exhaustive or to limit the embodiments to the precise form disclosed. Accordingly, modifications to the embodiments described herein may be possible. For example, according to an exemplary embodiment, any purchase made via the interactive masthead may be tracked for measurement, market effectiveness, and/or understanding of customer behaviors.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while a series of blocks has been described with regard to the process illustrated in FIG. 7, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software, firmware, and/or hardware. For example, a process or a function may be implemented as "logic" or as a "component." This logic or this component may include hardware (e.g., processor 205, etc.), a combination of hardware and software (e.g., application 215), a combination of hardware and firmware, or a combination of hardware, firmware, and software. The embodiments have been described without reference to the specific software code since software can be designed to implement the embodiments based on the description herein.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

No element, act, or instruction described in the present application should be construed as critical or essential to the embodiments described herein unless explicitly described as such.

What is claimed is:

1. A method comprising:
providing a television service via a customer device, wherein providing the television service comprises:
receiving a customer input to access a graphical user interface pertaining to the television service;
retrieving the graphical user interface; and
displaying the graphical user interface via the customer device, wherein the graphical user interface includes:
a main menu body that includes a main menu and a program window, wherein the main menu includes user-selectable menus of the television service;
an interactive masthead having an advertisement and an interactive element that permits a customer to access a content, which pertains to the advertisement, via the interactive element, wherein the interactive masthead is contextually-related to a context of one of the user-selectable menus of the main menu, wherein the user-selectable menus include a video-on-demand menu, a pay-per-view menu, a digital video recorder (DVR) menu, and a widgets menu, and wherein the interactive element permits the customer to auto-tune to a particular television channel, launch a widget, order and purchase a pay-per-view event or a video-on-demand event, or obtain cast member and storyline information pertaining to the pay-per-view event or the video-on-demand event, and correspondingly access the content that pertains to the advertisement and is contextually-related to the context of the one of the user-selectable menus;
receiving, during the displaying of the graphical user interface, a customer input via the interactive element, to access the content;
storing information indicating the interactive element of the interactive masthead that the customer accessed via the graphical user interface in response to receiving the customer input to access the content; and
using the information, a next time the customer provides a request to access the graphical user interface, to generate another interactive masthead that includes another advertisement and another interactive element that permits the customer to access a new content that is contextually-related to the one of the user-selectable menus.

2. The method of claim 1, further comprising:
receiving another customer input, via the main menu, to access another graphical user interface;
retrieving the other graphical user interface; and
displaying the other graphical user interface via the customer device, wherein the other graphical user interface includes an interactive masthead having an interactive element that is contextually-related to an interactive body of the other graphical user interface.

3. The method of claim 1, wherein the interactive masthead includes a reminder to view a purchased content.

4. The method of claim 1, wherein the interactive masthead includes a description element pertaining to the interactive element, and the method further comprising:
receiving another customer input, subsequent to receiving the customer input to access the content, to access the graphical user interface; and
displaying the graphical user interface via the customer device, based on the using of the information, wherein the graphical user interface includes the main menu body and the other interactive masthead that includes the other advertisement and the other interactive element.

5. The method of claim 1, wherein the content includes a pay-per-view event, a video-on-demand event, a free preview of a channel or a television package, or information pertaining to a service included in the television service, and wherein the interactive masthead is located at a top portion of the graphical user interface.

6. The method of claim 1, further comprising:
loading, by the customer device, the graphical user interface based on a communication with a network device, in response to the customer device being turned on; and
storing, by the customer device, the graphical user interface at the customer device based on the loading.

7. The method of claim 1, wherein the user-selectable menus are interactive graphical elements that permit the customer to access pay-per-view, video-on-demand, digital video recording (DVR), games, widgets, settings, and help, and the interactive element is an interactive graphical element of the graphical user interface.

8. The method of claim 1, further comprising:
tracking a purchase of content made, via the interactive masthead, by the customer.

9. A device comprising:
a communication interface;
one or more memories, wherein the one or more memories store instructions; and
one or more processors, wherein the one or more processors execute the instructions to:
provide a television service;
receive a customer input to access a graphical user interface pertaining to the television service;
obtain the graphical user interface; and
output the graphical user interface, wherein the graphical user interface includes:
a main menu body that includes a main menu and a program window, wherein the main menu includes user-selectable menus of the television service;
an interactive masthead having an advertisement and an interactive element that permits a customer to access a content, which pertains to the advertisement, via the interactive element, wherein the interactive masthead is contextually-related to a context of one of the user-selectable menus of the main menu, wherein the user-selectable menus include a video-on-demand menu, a pay-per-view menu, a digital video recorder menu, and a widgets menu, and wherein the interactive element permits the customer to auto-tune to a particular television channel, launch a widget, order and purchase a pay-per-view event or a video-on-demand event, or obtain cast member and storyline information pertaining to the pay-per-view event or the video-on-demand event, and correspondingly access the content that pertains to the advertisement and is contextually-related to the context of the one of the user-selectable menus;

receive, during an output of the graphical user interface, a customer input via the interactive element, to access the content;

store information indicating the interactive element of the interactive masthead that the customer accessed via the graphical user interface in response to receiving the customer input to access the content; and use the information, a next time the customer provides a request to access the graphical user interface, to generate another interactive masthead that includes another advertisement and another interactive element that permits the customer to access a new content that is contextually-related to the one of the user-selectable menus.

10. The device of claim 9, wherein the one or more processors further execute the instructions to:

receive another customer input, via the main menu, to access another graphical user interface;

obtain the other graphical user interface; and output the other graphical user interface, wherein the other graphical user interface includes an interactive masthead having an interactive element that is contextually-related to an interactive body of the other graphical user interface.

11. The device of claim 10, wherein the interactive masthead includes a social message.

12. The device of claim 9, wherein the interactive masthead includes a description element pertaining to the interactive element, and wherein the one or more processors further execute the instructions to:

receive another customer input, subsequent to a receipt of the customer input to access the content, to access the graphical user interface; and display the graphical user interface based on a use of the information, wherein the graphical user interface includes the main menu body and the other interactive masthead that includes the other advertisement and the other interactive element.

13. The device of claim 9, wherein the content includes a pay-per-view event, a video-on-demand event, a free preview of a channel or a television package, or information pertaining to a service pertaining to the television service, and wherein the interactive masthead is located at a top portion of the graphical user interface.

14. The device of claim 9, wherein the one or more processors further execute the instructions to:

load the graphical user interface based on a communication, via the communication interface, with a network device, in response to the device being turned on; and store the graphical user interface at the device based on a loading of the graphical user interface.

15. The device of claim 14, wherein the user-selectable menus are interactive graphical elements that permit the customer to access pay-per-view, video-on-demand, digital video recording (DVR), games, widgets, settings, and help, and the interactive element is an interactive graphical element of the graphical user interface.

16. A method comprising:

receiving an input request to access a graphical user interface pertaining to a television service;

storing the graphical user interface;

identifying the graphical user interface based on the received input request;

transmitting the graphical user interface to a customer device; and displaying the graphical user interface, wherein the graphical user interface includes:

a main menu body that includes a main menu and a program window, wherein the main menu includes user user-selectable menus of the television service;

an interactive masthead having an advertisement and an interactive element that permits a user to access a content, which pertains to the advertisement, via the interactive element, wherein the interactive masthead is contextually-related to a context of one of the user-selectable menus of the main menu, wherein the user-selectable menus include a video-on-demand menu, a pay-per-view menu, a digital video recorder menu, and a widgets menu, and wherein the interactive element permits the customer to auto-tune to a particular television channel, launch a widget, order and purchase a pay-per-view event or a video-on-demand event, or obtain cast member and storyline information pertaining to the pay-per-view event or the video-on-demand event, and correspondingly access the content that pertains to the advertisement and is contextually-related to the context of the one of the user-selectable menus;

receiving, during the displaying, an input via the interactive element to access the content;

storing information indicating the interactive element of the interactive masthead that the user accessed via the graphical user interface in response to receiving the input; and using the information, a next time the user provides a request to access the graphical user interface, to generate another interactive masthead that includes another advertisement and another interactive element that permits the user to access a new content that is contextually-related to the one of the user-selectable menus.

17. The method of claim 16, further comprising:

receiving another input request, via the main menu, to access another graphical user interface;

storing the other graphical user interface;

identifying the other graphical user interface based on the received other input request;

transmitting the other graphical user interface to the customer device; and displaying the other graphical user interface, wherein the other graphical user interface includes an interactive masthead having an interactive element that is contextually-related to an interactive body of the other graphical user interface.

18. The method of claim 17, wherein the other graphical user interface pertains to one of pay-per-view, video-on-demand, widgets, games, television listings, messages, settings, or help.

19. The method of claim 16, wherein the content includes a pay-per-view event, a video-on-demand event, a free preview of a channel or a television package, or information pertaining to a service pertaining to the television service.

20. The method of claim 16, further comprising:

receiving, another input, subsequent to receiving the input to access the content, to access the graphical user interface; and displaying the graphical user, based on the using of the information, wherein the graphical user interface includes the main menu body and the other interactive masthead that includes the other advertisement and the other interactive element.

* * * * *